(12) United States Patent
Kiljunen et al.

(10) Patent No.: US 8,309,220 B2
(45) Date of Patent: Nov. 13, 2012

(54) COATING FOR WOOD BOARD AND WOOD BOARD

(75) Inventors: Samantha Kiljunen, Lappeenranta (FI); Milla Hintikka, Lahti (FI); Raija Rautiainen, Lahti (FI); Mizanur Bulbul, Lahti (FI); Jouko Hannukainen, Lahti (FI)

(73) Assignee: UPM-Kymmene Wood Oy, Lahti (FI)

( * ) Notice: Subject to any disclaimer, the term of this patent is extended or adjusted under 35 U.S.C. 154(b) by 0 days.

(21) Appl. No.: 13/120,487

(22) PCT Filed: Aug. 17, 2009

(86) PCT No.: PCT/FI2009/050663
§ 371 (c)(1),
(2), (4) Date: Mar. 23, 2011

(87) PCT Pub. No.: WO2010/034877
PCT Pub. Date: Apr. 1, 2010

(65) Prior Publication Data
US 2011/0177317 A1    Jul. 21, 2011

(30) Foreign Application Priority Data
Sep. 23, 2008 (FI) .................................... 20085896

(51) Int. Cl.
*B32B 21/08* (2006.01)
*B32B 27/04* (2006.01)
*B32B 27/26* (2006.01)
*B32B 27/32* (2006.01)

(52) U.S. Cl. ................ 428/354; 428/355 EN; 428/522; 428/523; 428/537.1

(58) Field of Classification Search .................. None
See application file for complete search history.

(56) References Cited

U.S. PATENT DOCUMENTS

| | | | |
|---|---|---|---|
| 4,958,201 A | 9/1990 | Mimura | |
| 4,980,210 A | 12/1990 | Heyes | |
| 5,243,126 A | 9/1993 | Chow et al. | |
| 5,654,091 A | 8/1997 | Kiriazis et al. | |

FOREIGN PATENT DOCUMENTS

| | | |
|---|---|---|
| DE | 36 39 564 A1 | 6/1988 |
| EP | 0 429 253 A2 | 5/1991 |
| EP | 0 782 917 A1 | 7/1997 |
| WO | WO 99/06210 A1 | 2/1999 |

OTHER PUBLICATIONS

International Search Report for corresponding International Patent Application No. PCT/FI2009/050663 mailed Nov. 11, 2009.
Finnish Search Report for corresponding Finnish Patent Application No. 20085896 mail May 12, 2009.

*Primary Examiner* — Ramsey Zacharia
(74) *Attorney, Agent, or Firm* — Merchant & Gould P.C.

(57) ABSTRACT

The invention relates to a coating for a wood board. In accordance with the invention, the coating is formed of at least three layers, which are the first (1) layer formed of a film containing polyolefin and a coupling agent which is reactive with —OH groups of the wood for forming self-adhesive properties, second (2) layer selected from the group signaling layer and decorative layer and third (3) layer formed of a film containing polyolefin and the coupling agent which is reactive with —OH groups of the wood for forming self-adhesive properties, and the second layer is arranged between the first and third layers, and the layers are joined together by means of the coupling agent. Further, the invention relates to a wood board (4) which has been coated by said coating.

14 Claims, 4 Drawing Sheets

COATING FOR WOOD BOARD AND WOOD BOARD

This application is a National Stage Application of PCT/FI2009/050663, filed 17 Aug. 2009, which claims benefit of Serial No. 20085896, filed 23 Sep. 2008 in Finland and which applications are incorporated herein by reference. To the extent appropriate, a claim of priority is made to each of the above disclosed applications.

FIELD OF THE INVENTION

The invention relates to a coating for a wood board as defined in the preamble of claim 1 and to a wood board as defined in the preamble of claim 15.

BACKGROUND OF THE INVENTION

Known from prior art are various wood boards, e.g. plywoods, veneer boards or the like.

Known from prior art is the gluing of different types of adhesive labels or product specifications onto the surface of the wood board in a separate working phase to provide product information.

Also known is to glue coating layers on top of the veneer layers, e.g. with a polyurethane or phenolic glue.

Further, the attachment of different identifiers to a wood board is known from prior art.

From U.S. Pat. Nos. 5,243,126, 5,654,091, EP0782917, WO 9906210 and EP 0429253 different wood panels and coatings are known.

OBJECTIVE OF THE INVENTION

The objective of the invention is to disclose a new type of coating, its production and the attachment of the coating to a wood board. Further, the objective of the invention is to disclose conversion of the coupling agent to an active form for forming the coating and for attaching the coating on the wood board.

SUMMARY OF THE INVENTION

A coating and a wood board according to the invention is characterized by what is presented in the claims.

The invention is based on a coating for a wood board. In accordance with the invention, the coating is formed of at least three layers, which are the first layer formed of a film containing polyolefin and a coupling agent which is reactive with —OH groups of the wood for forming self-adhesive properties, second layer selected from the group signaling layer and decorative layer and third layer formed of a film containing polyolefin and the coupling agent which is reactive with —OH groups of the wood for forming self-adhesive properties, and the second layer is arranged between the first and third layers, and the layers are joined together by means of the coupling agent.

The invention is specifically based on the coating material having certain properties and structure. The layers of the coating are substantially joined together by the coupling agent which is reactive with —OH groups of the wood, preferably via esterification, for forming self-adhesive properties, e.g by maleic anhydride polyolefin. The coating material is used as the coating on the wood board, and preferably the coating material is arranged on the surface of the wood board by the coupling agent. Preferably, the second layer of the coating is arranged between the first and third layers for providing a protected second layer.

In this context, a wood board refers to any wood panel product, plywood product, composite product, beam, pressed panel product or the like, formed of a number of layers, preferably veneer layers, and principally of wood-based materials, in which the layers are laid one upon the other and glued together. Further, a wood board refers to any wood product or fiber product.

In this context, a layer refers to any layer of material, typically a thin layer of material.

The first and third layers consist of a film. The film of the first and/or third layer can be a mono-layer, 2-layer or 3-layer film. In one embodiment the film can comprises more than three film layers e.g. 3-10 film layers.

In one embodiment of the invention at least one layer of the film contains the coupling agent.

In a preferred embodiment the layer, the film or the film layer which includes the coupling agent also contains polymer e.g. polyethylene or polypropylene.

In one embodiment the film is preferably a self-adhesive film. The self-adhesive film is provided by the coupling agent which reacts with —OH groups in other material e.g. natural products like wood or wood derivative products.

In one embodiment of the invention the coupling agent is selected from the group: grafted silanes, grafted isocyanates, grafted epoxy groups and maleic anhydride polyolefin, e.g. maleic anhydride grafted polypropylene (MAPP), maleic anhydride grafted copolymer and maleic anhydride grafted polyethylene (MAPE).

In one embodiment of the invention the coupling agent or polyolefin of the coupling agent or the film containing coupling agent is grafted with alkoxysilane containing reactive functional groups with the polyolefin. In one embodiment the polyolefin is grafted with hydrolysable vinyl-mono-, -di- or -tri-alkoxysilane. In one embodiment vinyl group can be replaced with isosyanate- or epoxy groups. Alkoxysilanes alcohol groups can be methyl-, ethyl-, propyl- or isopropyl-groups and silane can contain 1,2 or 3 alkoxy-groups. The reaction with polyolefin with the vinyl or other reactive groups happens already during the manufacturing of the coupling material, and reaction with wood by silane-groups during or after the manufacturing of the wood board.

Preferably the coupling agent forms covalent bonds, ester bonds and/or covalent bonds via esterification with celluloses —OH groups. In one embodiment the coupling agent forms covalent bonds via esterification with celluloses —OH groups.

In one embodiment of the invention the coupling agent is activated at temperatures of more than 180° C. during the manufacture of the coupling material. The coupling material can be manufactured by co-extrusion. Also other extrusion methods are possible. The extrusion temperature is between 180-200° C. In a preferred embodiment an extrusion melt temperature of 200° C. for 2 minutes is employed, which is sufficient time to convert the coupling agent to a reactive form. The coupling agent formed contains activated functional groups capable of forming the maximum number of covalent and/or ester bonds with —OH groups of wood. The melt index of the polyolefin being $\leq 4$ g/10 min (measured 190° C./2.16 kg) makes the activation of the reactive groups possible in film form.

In a preferred embodiment of the invention the layers are joined together by means of the maleic anhydride polyolefin. The maleic anhydride forms covalent bonds, preferably covalent bonds via esterification, with celluloses —OH groups.

Preferably, maleic acid is converted to maleic anhydride during the film manufacturing. The film can be manufactured by co-extrusion of the polyolefin and maleic anhydride grafted polyolefin. Also other extrusion methods are possible. The extrusion temperature is between 180-200° C. In a preferred embodiment of the coating process an extrusion melt temperature of 200° C. for 2 minutes is employed, which is sufficient time to convert the coupling agent from maleic acid to maleic anhydride. The film formed contains activated functional groups capable of forming the maximum number of covalent bonds with —OH groups of wood. In one embodiment maleic anhydride conversion is more than 86% and unconverted maleic acid conversion is less than 14% in the film or in the layer of the film containing the maleic anhydride polyolefin. In one preferred embodiment maleic anhydride conversion is more than 92% and unconverted maleic acid conversion is less than 8%.

In one embodiment of the invention the first layer is a protective layer, preferably with a melting point over 170° C. Preferably, the melting point of the surface layer is over 170° C. in order to make it self releasing from pressing plate. Preferably the first layer provides the protection for the other layers. In one embodiment the protective layer is treated with silane compounds for making the surface water repellent. In one embodiment the protective layer can be treated with UV-protection chemical.

In one embodiment of the invention the first layer contains polyethylene (PE), polypropylene (PP), the coupling agent, e.g. maleic anhydride polyethylene (MAPE) or maleic anhydride polypropylene (MAPP), polyamide (PA), polyethylene terephthalate (PET), polyethylene naphthalenedicarboxylate (PEN), polystyrene (PS) or metallocene produced polyethylene (TIE), derivates thereof or their combinations. The first layer can include additives, fillers and cross-linking materials. In a preferred embodiment the TIE-material includes maleated polyolefin.

The outer surface or the outer film layer of the first layer, preferably the protective layer, can be made from e.g. polyamide (PA), polyimide, polyphenylene oxide, polysulphone and/or polyphenylene sulphide with or without fillers. In one embodiment the composition of the protective layer can be PP/TIE/PE+MAPE, PA/TIE/PE+MAPE or PET/TIE/PE+MAPE. The tie material is a compatibilizer that bonds dissimilar polymers together. The purpose of this layer will be to increase surface properties, e.g. scratch resistance, impact resistance, printability, hardness and/or wear resistance.

In a preferred embodiment the first layer or at least one film layer of the first layer contains the coupling agent. In one embodiment the outer film layers of the first layer contains the coupling agent. In one embodiment at least the film layer of the first layer nearest the second layer contains the coupling agent.

In one embodiment the third layer is a bottom layer.

In one embodiment of the invention the third layer contains polyethylene (PE), polypropylene (PP), the coupling agent, e.g. maleic anhydride polyethylene (MAPE) or maleic anhydride polypropylene (MAPP), metallocene produced polyethylene (TIE), derivates thereof or their combinations.

In a preferred embodiment the third layer or at least one film layer of the third layer contains the coupling agent. In one embodiment the outer film layers of the third layer contains the coupling agent. In one embodiment at least the film layer of the third layer nearest the second layer contains the coupling agent.

In one embodiment the film layer of the first or third layer including maleic anhydride polyolefin essentially consists of MAPE+PE or MAPP+PP. In one embodiment the first and/or third layer can be formed of film layers MAPE+PE/PE/MAPE+PE or MAPP+PP/PP/MAPP+PP in which the maleic anhydride polyolefin film layers are arranged into the outer film layers of the film. In one embodiment the third layer is formed of film layers of MAPE+PE/MAPE+PE/MAPE+PE or MAPP+PP/MAPP+PP/MAPP+PP in which the maleated polyolefin is included in all the film layers. In one embodiment the film contains 2-15% w/w maleic anhydride.

In one embodiment all the film layers of the first layer or of the third layer is formed of the thermoplastic material.

The first, second and/or third layers can be made from petrochemical and renewable feedstock materials. In addition to bioplastic material, preferably the bio-based polymers having processing temperature over 180° C. or over 190° C., can be used.

In one embodiment, all film layers of first and/or third layer are substantially formed of the same material. In an alternative embodiment, at least one film layer of said layer is formed of a different material than the other films layers.

In one embodiment of the invention the second layer contains material selected from the group: paper, woven or non-woven cloth material, textile material, derivates thereof or their combinations. The second layer can include any type of porous material. In one embodiment the porous material can be made of tissue paper or other porous paper.

In one embodiment the second layer contains polyolefin, e.g. polyethylene, polypropylene or their combinations. In one embodiment the second layer contains the coupling agent, e.g. MAPE or MAPP. In one embodiment the second layer is arranged in the form of the film.

In one embodiment the second layer comprises polyolefin or some other material which can join to and react with the coupling agent of the first or third layer.

In a preferred embodiment, the first and the third layers penetrate, preferably completely, into the porous second layer for forming a water resistant composite laminate.

In one embodiment the signaling material is substantially arranged in conjunction with a film of the signaling layer. In one embodiment the second layer contains a decorative film or a decorative film layer.

In one embodiment the signaling layer comprises an RFID-identifier. In one embodiment the RFID-identifier has an RFID identification circuit. The RFID-identifier can be e.g. an RFID transponder, RFID inlay, etc. The RFID identifier may comprise a sensor.

In one embodiment the signaling layer comprises a protected bar-code indicator.

In one embodiment the signaling layer comprises a chemical indicator, e.g. pH or CO indicator, or a warning indicator indicating chemical contamination in the air.

In one embodiment the signaling layer comprises a digital material e.g. an epaper.

The second layer or at least one film layer of the second layer can be printed, painted and/or pigmented. The second layer or its film layer can be pigmented with opacity pigment, colour pigment and/or fluorescent pigment. The second layer can include different texts, figures, designs and/or instructions.

By the material of the second layer, e.g. by fiber cloth, can be improved properties of the first or protective layer. When the second layer is paper, porous low strength and high strength paper is suitable for outdoor use, because the paper is sealed against moisture. Higher strength dense papers are useful for indoor use.

In one embodiment the second layer can be pre-treated or primed to increase its compatibility with the coupling agent, preferably with the maleic anhydride groups.

The layer thickness of the coating may vary depending on the properties of the film materials or materials and the application of the wood board.

A compatibilizing agent can be added to any layer in order to adhere the dissimilar polymers to each other.

Further, the invention is based on a wood board, which has been coated by the coating according to invention as defined above.

A wood board according to the invention can comprise veneer layers of different thickness. The thicknesses of the veneer layers can vary. The veneer layers can be arranged in the desired position, i.e. crosswise or lengthwise in the desired order.

The wood board can be made using apparatuses and methods known per se. Laying the veneers one upon the other, joining them together and other typical steps in making the wood board can be performed in any manner known per se in the art.

Arranging the coating of the invention on the surface of the wood board can be performed e.g. using the hot pressing technique, extruder technique, film technique, roll application technique, cylinder application technique, coat and multi-layer coat application technique, all known per se, their combinations or a corresponding technique. The veneers can be joined together e.g. using the hot pressing technique.

In one embodiment the coating is attached onto the wood board by the film including the coupling agent, e.g. maleic anhydride polyolefin, or by glue, e.g. phenolic glue. The coupling agent is easy to use as glue line. Adhesion on wood is excellent.

The nearest layer of the coating on the wood board is the bottom layer. In a preferred embodiment the nearest film layer of the bottom layer on the wood board is a self-adhesive film including the coupling agent.

In one embodiment the coating can be pre-laminated to make handling easier and more economical.

The wood board can be decorated with a printed material, or the printed material can be used as signaling, coloring or text containing layer on the boards. The signaling layer can be visible in a normal way, or it can be fluorescent or visible only with ultraviolet light illumination. The signaling layer can also change color according to temperature changes.

The signaling layer can be comprise colour or visible printing that combined with temperature or with chemicals for warning people of hazardous chemicals.

The coating of the invention provides a protective and moisture-proof surface for different wood boards. The coating functions as a moisture barrier material.

Further, a desired design can be provided on the coating and on the wood board.

The surface of the coated wood board is easily cleaned and kept clean due to the coating of the invention arranged on the surface of the wood board.

The coating and the wood board in accordance with the invention is suitable for various applications. These kinds of products can be used as decorating panels, signalling road signs, building site signs and kick boards and other applications.

BRIEF DESCRIPTION OF THE DRAWINGS

In the following, the invention is described by means of detailed embodiment examples with reference to accompanying FIGS. 1 and 2, in which.

DETAILED DESCRIPTION OF THE INVENTION

Figure 1:
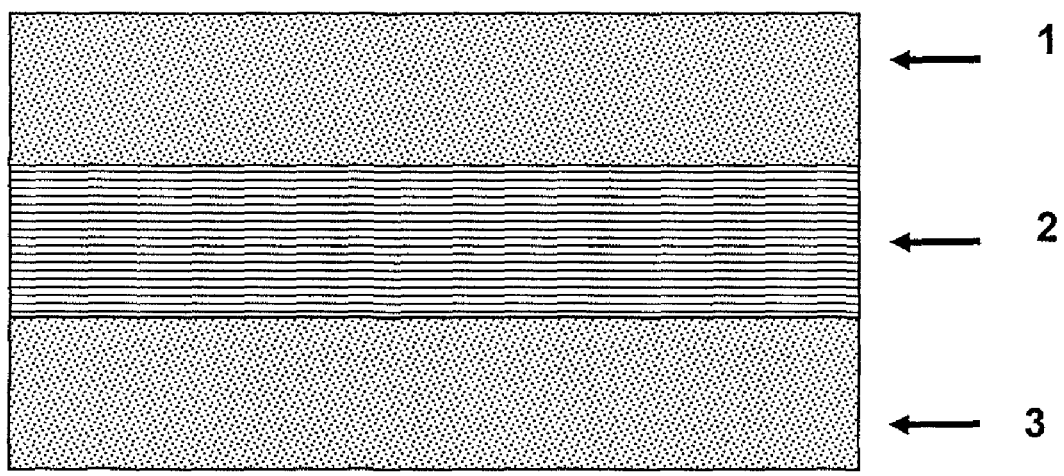
FIG. 1 shows a coating according to the invention.
Figure 3:
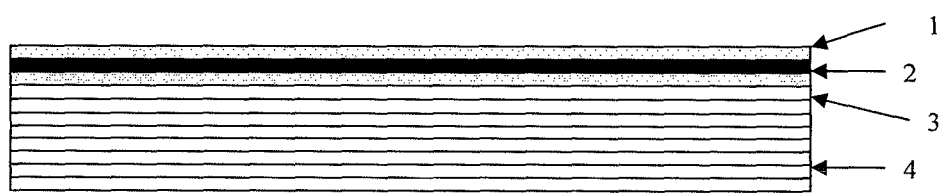
FIG. 3 shows a laminate coating structure on plywood according to the invention.

FIGS. 1 and 3 disclose the coating structure of the invention.

A top layer (1) is formed of PE/PE/MAPE+PE, PE/MAPE+PE/MAPE+PE, MAPE+PE/MAPE+PE/MAPE+PE, PP/PP/MAPP+PP, PP/MAPP+PP/MAPP+PP, MAPP+PP/MAPP+PP/MAPP+PP, PP/TIE/MAPE+PE, PET/PE+MAPE/MAPE+PE, PET/TIE/MAPE+PE, PA/PE+MAPE/MAPE+PE or PA/TIE/MAPE+PE including additives and fillers. The top layer is formed of the 3-layer film coextruded. The thickness of the top layer is 0.05-1 mm. The top layer is a protective layer.

A signaling layer (2) is formed of PE, PP, paper, cloth (woven or non-woven), RFID, decorative material or their combinations. The material of the signaling layer can be printed, painted or pigmented.

A bottom layer (3) is formed of MAPE+PE/PE/MAPE+PE, MAPE+PE/MAPE+PE/MAPE+PE, MAPP+PP/PP/MAPP+PP or MAPP+PP/MAPP+PP/MAPP+PP including additives and fillers. The bottom layer is formed of the 3-layer film. The thickness of the bottom layer is 0.1-1 mm. The bottom layer is a self adhesive layer. At least one film layer of the bottom layer can be pigmented or printed.

The signalling layer is sandwiched between the top layer and the bottom layer.

Figure 2:
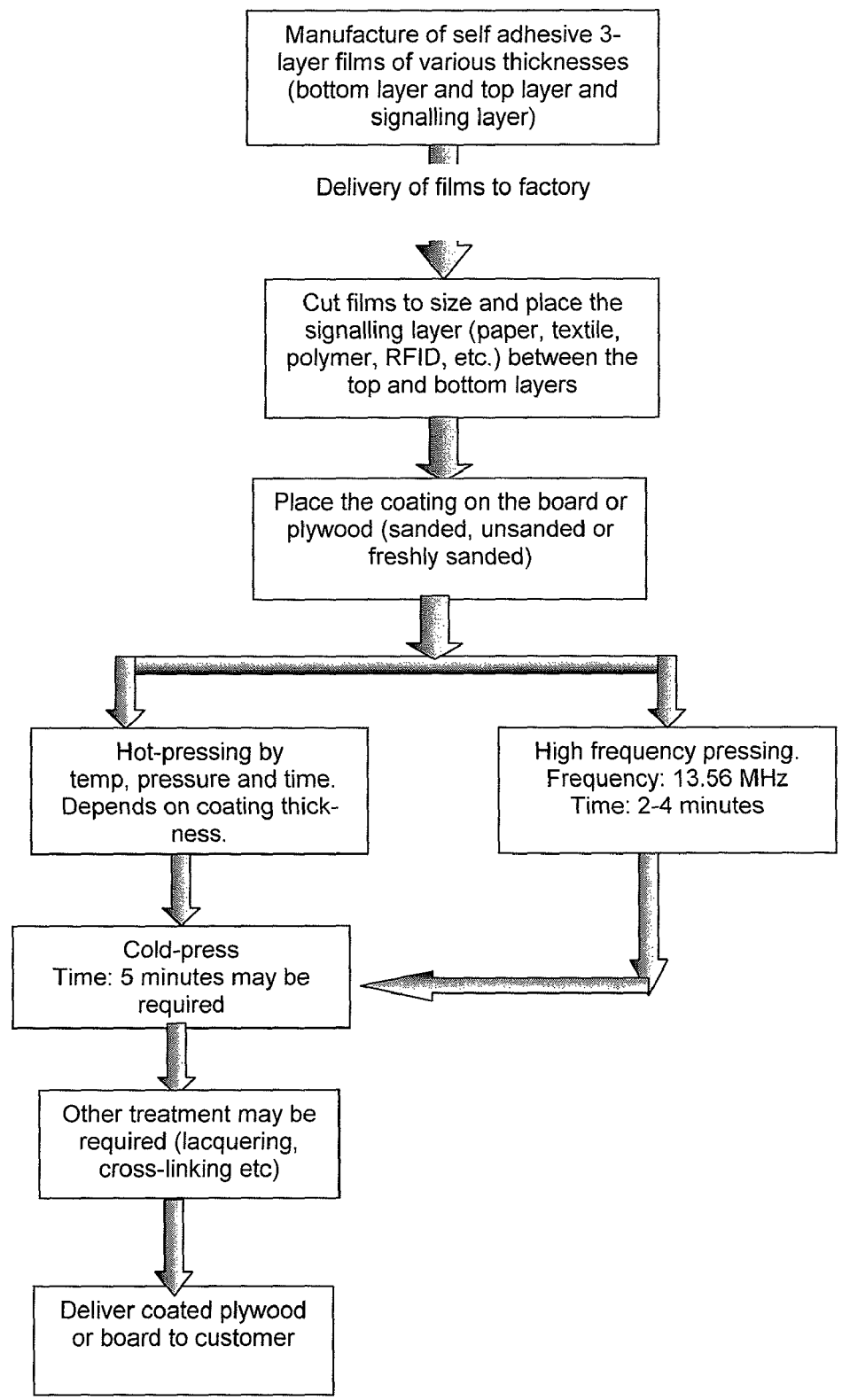
FIG. 2 shows a method for making the coating and the wood board according to the invention.

Further, the coating and wood board used in the tests can be prepared according to FIG. 2.

A wood board (4) is plywood, particle board, high or middle density fiberboard, or some other pressed and glued board containing wood or other plant fibers.

If the signalling layer is not a polyolefin layer it must be so sparse that enough melt polymer material from the top layer can join to the bottom layer, or it must be reactive with the maleated groups. Polyolefins here are polyethylene (PE) or polypropylene (PP). Maleated polyolefin (MAPE or MAPP) can be also used so that the top layers composition is PE/PE/PE+MAPE or PP/PP/PE+MAPE or PP/TIE/PE+MAPE. When dissimilar polymers are co-extruded a compatibiliser material is required in the signalling layer to join the dissimilar materials. This layer is often referred to as a tie-layer.

The maleated polyolefin contains normally 2-15% maleic acid of the amount of polyolefin. At extrusion the maleic acid is converted to maleic anhydride, partially or totally. The polymer film can also be cross-linkable if it in any case improves the use of the products. The maleated films are pressed at temperature 120-170° C. to the wood surface and to the other films and layers. It is important in order to include plastic melt flow that the hot-pressing temperature is set to a temperature 20-50° C. above the melting temperature of the polymer. The top layer can be cross-linked by vinyl-silane hydrolysis method or electron beam (EB) radiation. Additives and fillers having near the same refraction index as base polymer or particle size <150 nm, can be used for improving the scratch resistance.

EXAMPLE 1

In this example, the coatings of the invention used in the tests were prepared. The protective top layer (1) was PE/PE/PE+2% MAPE (0.27 mm) and the self adhesive bottom layer (3) was 2% MAPE+PE/PE/PE+2% MAPE (0.1 mm). The signalling layers (2) which are disclosed in the table 1 were used. The signalling layer was arranged between the top and bottom layers.

Further, the 15 mm plywood used as wood board (4) in the tests was prepared.

Experimental results are shown in Table 1. Table 1 discloses adhesion strength and boiling test results for textile signaling coatings bonded to the sanded plywood.

The coating was arranged by hot-pressing onto the surface the plywood in a manner known per se.

TABLE 1

| Signalling layer | Adhesion properties | | | |
|---|---|---|---|---|
| | Strength N/mm² | Wood failure | Failure point | Boiling test |
| 50% cotton + 50% polyester | 1.4 | 95 | wood | pass |
| 65% cotton + 35% polyester | 1.2 | 100 | wood | pass |
| 100% silk | 1.4 | 90 | wood | pass |

TABLE 1-continued

| Signalling layer | Adhesion properties | | | |
|---|---|---|---|---|
| | Strength N/mm² | Wood failure | Failure point | Boiling test |
| 87% polyester + 13% acrylic ester polymer | 1.3 | 100 | wood | pass |
| 100% cotton | 1.3 | 100 | wood | pass |
| 100% viscose fiber | 1.6 | 100 | wood | pass |

From the test it was discovered that a protected coating of the invention is a suitable coating to be used for making wood boards.

EXAMPLE 2

Adhesion of the coating tested by the shearing test (EN319 and EN 204). Measurements were made after soaking and boiling in addition to the dry samples. Table 2 shows the shearing test results for different types of the printed coating. Table 2 discloses birch plywood coating adhesive properties by shearing test (EN319 and EN 204). The melt index of the polyethylene was MI-0.3 g/10 min (190° C./2.16 kg). The coupling agent was Fusabond MB-226DE (MAPF). Pressing conditions were: temperature 135° C., pressure 1.8 N/mm² and time 4 minutes. In all cases three layers were applied (FIG. 3). FIG. 3 discloses laminate coating structure on plywood (4). The top layer (1) was always 3-layer film PE/PE/PE+2% MAPE (0.1 mm) and the bottom layer (3) was always 3-layer film 2% MAPE+PE/PE/PE+2% MAPE (0.27 mm) but the middle layer (2) varied. The middle layer has been formed of paper, textile, woven and non-woven materials. The middle layer is defined in the table 2. In almost all cases the breakage was in the wood. In a few cases, especially after boiling, there was breakage between the coating and wood. There was only one coating where the breakage was in the coating itself. Therefore, the plastic sandwich allows for cheap materials, such as tissue paper and non-woven materials, to be printed on and then securely protected from the environment.

TABLE 2

| Middle layer material | Dry | | After soaking | | After boiling | |
|---|---|---|---|---|---|---|
| | Strength (N/mm²) | Breakage | Strength (N/mm²) | Breakage | Strength (N/mm²) | Breakage |
| No middle layer | 1.45 | Wood | 0.81 | Wood | 0.29 | P/W |
| Glass fibre SAC 50/2 | 1.23 | Wood | 0.89 | Wood | 0.32 | P/W |
| Polyester Spunpond (120 g/m²) | 1.39 | Wood | 0.83 | P/W | 0.32 | Wood |
| Geotextile (120 g/m²) | 1.15 | Wood | 0.70 | Wood | 0.40 | Wood |
| Ahlstrom paper | 1.18 | Wood | 0.58 | Wood | 0.33 | P/W |
| Ahlstrom paper (lam. first) | 1.16 | Wood | 0.76 | Wood | 0.48 | P/W |
| Photocopy paper 80 g/m² (non-porous) | 0.6 | Paper | 0 | Paper | 0 | Paper |

*P/W: breakage between coating and wood

From the test it was discovered that a coating of the invention is a suitable coating to be used for making wood boards.

EXAMPLE 3

Adhesion, water and calcium boil proof and scratch resistance of the coating tested by the shearing test (EN319 and EN 204). Measurements were made after boiling. Table 3 shows the shearing test results for different types of signaling textile material specified in Table 3. Table 3 discloses birch plywood coating adhesive properties by shearing test (EN319 and EN 204). The melt index of the polyethylene was MI-0.3 g/10 min (190° C./2.16 kg). The coupling agent was Fusabond MB-226DE (MAPE). Pressing conditions were: temperature 135° C., pressure 1.8 N/mm² and time 4 minutes. In all cases three layers were applied (FIG. 3). The top layer (1) was always S-layer film PE/PE/PE+2% MAPE (0.1 mm) and the bottom layer (3) was always 3-layer film 2% MAPE+PE/PE/PE+2% MAPE (0.27 mm) but the middle layer (2) varied. The signaling layer (2) is defined in the table 3. In all cases the breakage was in the wood. All of the coatings passed the boiling test. The plastic sandwich allows for cheap materials to be printed on and then securely protected from the environment.

TABLE 3

| Signaling layer | Strength N/mm² | Wood failure | Failure point | Boiling test |
|---|---|---|---|---|
| 50% cotton + 50% polyester | 1.4 | 95 | wood | pass |
| 65% cotton + 35% polyester | 1.2 | 100 | wood | pass |
| 100% silk | 1.4 | 90 | wood | pass |
| 87% polyester + 13% acrylic ester polymer | 1.3 | 100 | wood | pass |
| 100% cotton | 1.3 | 100 | wood | pass |
| 100% viscose fiber | 1.6 | 100 | wood | pass |

Table 4 discloses birch plywood coating water and calcium boil proof test.

TABLE 4

| Middle layer | Water Boiling test | CaOH₂ Boiling test |
|---|---|---|
| No paper | Pass | Pass |
| Glass fibre SAC 50/2 | Pass | Pass |
| Polyester Spunpond (120 g/m²) | Pass | Pass |
| Geotextile (120 g/m²) | Pass | Pass |
| Ahlstrom paper | Pass | Pass |
| Ahlstrom paper (lam. first) | Pass | Pass |
| Printed Mape 0.27 + 2% Mape 0.27 ** | Pass | Pass |
| Photocopy paper (80 g/m²) non-porous | Fail | Fail |

It can be seen from Table 4 that the coatings are boil proof. The CaOH$_2$ boiling test results are very important especially if the coatings are to be used in formwork for concrete applications.

Table 5 discloses birch plywood coating scratch resistance (ISO 4578, SFS-EN204). The melt index of the polyethylene was MI-0.3 g/10 min (190° C./2.16 kg). The coupling agent was Fusabond MB-226DE (MAPE). Pressing conditions were: temperature 135° C., pressure 1.8 N/mm² and time 4 minutes. The structure of the bottom layer (3) was always 2% MAPE+PE/PE/PE+2% MAPE (0.27 mm). The middle layer (2) was always paper and the top-layer (1) is defined in the table 5.

TABLE 5

| Top layer | Coating thickness (mm) | Middle layer | Bottom layer | Scratch resistance (N) |
|---|---|---|---|---|
| PA (0.012 mm)/ MI-0.3 PE + 3% MAPE | 0.12 | Paper | Yes | 8 |
| PP/2% MAPP + EVA + mll/ MI-0.3 PE + 2% Mape | 0.1 | Paper | Yes | 6 |
| PA (0.14 mm/ MI-0.25 PE + 3% Mape | 0.23 | Paper | Yes | 16 |
| PA (0.14 mm)/ MI-4 PE + 3% Mape | 0.24 | Paper | Yes | 14 |
| PA (0.012 mm)/ MI-0.3 PE + 3% MAPE | 0.12 | No | No | 4 |
| PP/2% MAPP + EVA + mll/ MI-0.3 PE + 2% Mape | 0.1 | No | No | 6 |
| PA (0.14 mm)/ MI-0.25 PE + 3% Mape | 0.23 | No | No | 12 |
| PA (0.14 mm)/ MI-4 PE + 3% Mape | 0.24 | No | No | 12 |

MI is the melt index of a polymer. It is a measure of the melt viscosity, but it is the inverse of real viscosity.

The scratch resistant results in Table 5 show that the polyamide is very effective at creating a scratch resistant protective layer. The very thin polyamide layer 12 μm does not provide significant scratch resistant properties but provides sufficient properties at a very cost effective price. In addition to this owing to the melting point of the coating being 240° C. it provides also the possibility of hot-pressing the coating without needing any release paper. When the laminated polyamide layer is 0.14 mm thick the scratch resistance is very high.

EXAMPLE 4

In this example, stability of the coating of the invention was tested.

Figure 4:
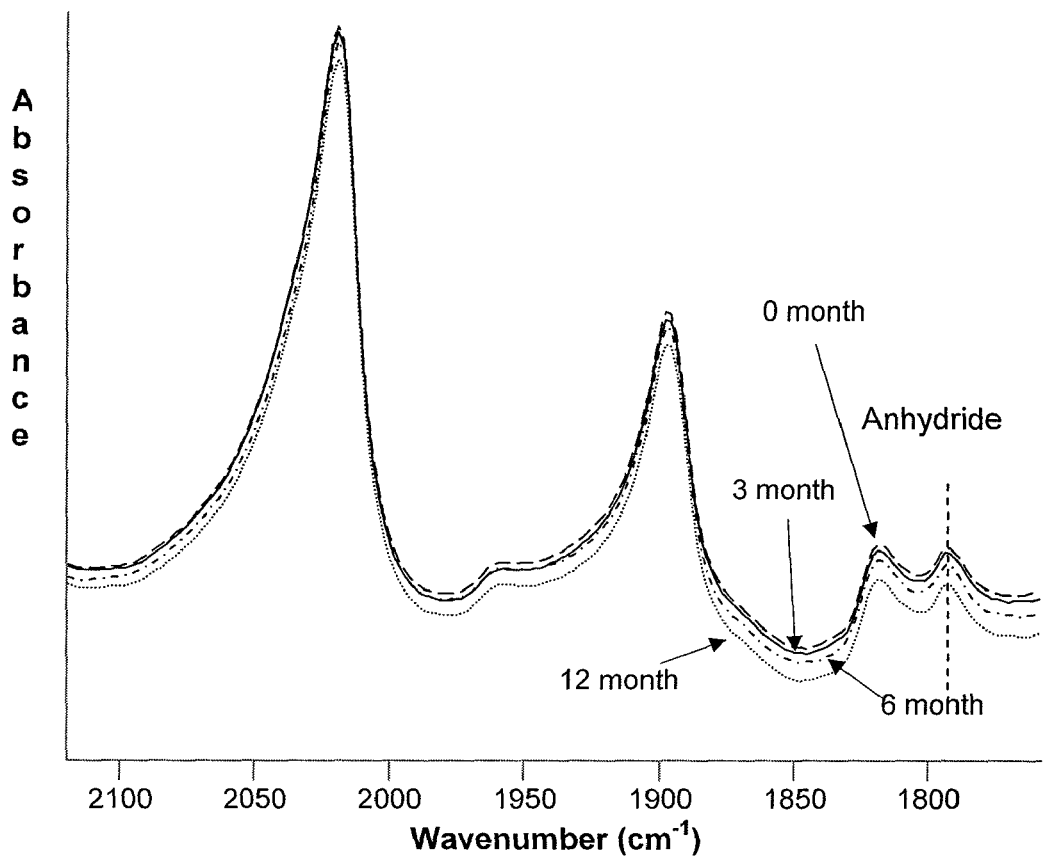
FIG. 4 shows the ATR spectroscopy results.

Tables 6 to 8 and FIG. 4 show and the conversion of maleic acid to maleic anhydride and its affect on the glue-line strength and the stability of the films after maleic anhydride is converted to the active state and contact angles of the polar groups face inwards.

Table 6 shows the conversion to maleic anhydride during film manufacturing of maleic anhydride grafted polyethylene (Fusabond MB-226DE) film 2% MAPE+PE/PE/2% MAPE+PE at different extrusion temperatures.

TABLE 6

| Treatment temperature (° C.) | Treatment time (minutes) | Maleic acid (%) | Maleic anhydride (%) | Coating glue-line strength N/mm² (wood failure %) After boiling |
|---|---|---|---|---|
| No treatment | 3 | 55 | 45 | — |
| 170 | 3 | 36 | 64 | 0.17 (0%) |
| 180 | 3 | 20 | 80 | 0.31 (70%) |
| 185 | 3 | 14 | 86 | 0.34 (80-90%) |
| 190 | 3 | 10 | 90 | 0.36 (90-100%) |
| 195 | 3 | 8 | 92 | 0.36 (90-100%) |

It is clear from the results of Table 6 that the maleic acid is converted mostly to maleic anhydride at temperatures of 185° C. for 3 minutes and therefore it can be considered that during extrusion where the polymer is in the melt for about 2-3 minutes that an extrusion temperature of >185° C. is sufficient but preferably >190° C. The coating glue-line strength and percentage wood failure is on a similar level after boiling as for Wisa Multi-wall (0.4 N/mm², 80-90% wood failure) which also supports that conversion of maleic acid to maleic anhydride is sufficient at temperatures of >185° C.

Once the maleic acid is converted to maleic anhydride it is important to know how long the films will remain in the active state before enough moisture is absorbed and the maleic anhydride is converted back to maleic acid. Films containing the activated material were conditioned (humidity 65% and temperature 23° C.) for 1 month, 3 month, 6 month and month. The films were analysed by ATR-FTIR spectroscopy.

FIG. 4 and Table 7 show the ATR spectroscopy results comparing the maleic anhydride in the films (Table 6) extruded for 2-3 minutes at 200° C. it is clear that sufficient maleic acid is converted to maleic anhydride and therefore the extrusion temperature and processing time is sufficient. FIG. 4 shows ATR-FTIR spectra of 3 different films identified in Table 7 (45 degree Germanium ATR unit).

TABLE 7

| Film | Coupling agent | Film age | Film type |
|---|---|---|---|
| 2 | Fusabond MB226DE | 1 year | 2% MAPE + PE/PE/2% MAPE + PE |
| 3 |  | 6 month | 2% MAPE + PE/PE/2% MAPE + PE |
| 4 |  | 3 month | 2% MAPE + PE/PE/2% MAPE + PE |

The results revealed no change in the amount of maleic anhydride and spectra similar to film-4 in FIG. 4 resulted after each month for a total of 12 months. This shows the maleic anhydride is stable long-term when surrounded by polyethylene. This is owing to the low water absorption of polyethylene and also to the fact in the solid state the maleic acid groups will not be at the polymer surface but facing inwards and therefore shielded. The maleic groups are only facing outwards when the polymer is in the melt. This theory of the hydrophilic groups facing inwards is supported by the contact angle results in Table 8. Table 8 shows contact angles (receded and advanced) and surface free energy measured for different activated 3-layer co-extruded films by the pendent drop method. Two test liquids were used diiodomethane (DIM) and water. The maleated polymer films were compared with other polar group (EVA) containing films.

TABLE 8

| Film type | | 2% MAPE + PE/PE/2% MAPE + PE | 4% EVA + PE/PE/2% EVA + PE | 8% EVA + PE/PE/8% EVA + PE |
|---|---|---|---|---|
| Film thickness (mm) | | 0.27 | 0.27 | 0.27 |
| Average water contact angle (°) | Advanced | 108.5 ± 0.6 | 98.8 ± 0.6 | 98.7 ± 1.6 |
|  | Receded | 89.6 ± 0.6 | 85.8 ± 0.6 | 83.0 ± 2.9 |
| Average DIM contact angle (°) | Advanced | 57.1 ± 1.2 | 53.8 ± 0.6 | 49.0 ± 1.4 |
|  | Receded | 46.7 ± 0.8 | 43.4 ± 1.1 | 43.8 ± 1.3 |
| Surface free energy (mJm$^{-2}$) | | 38 | 40 | 41 |

A coating and a wood board according to the invention are suitable in its different embodiments for different types of applications.

The embodiments of the invention are not limited to the examples presented rather many variations are possible within the scope of the accompanying claims.

The invention claimed is:

1. A coating for a wood board, wherein the coating is formed of at least three layers, which are a first layer formed of a film containing polyolefin and a coupling agent which is reactive with —OH groups of the wood for forming self-adhesive properties, a second layer which is a signaling layer, and a third layer formed of a film containing polyolefin and the coupling agent which is reactive with —OH groups of the wood for forming self-adhesive properties, and the second layer is arranged between the first and third layers, and the layers are joined together by means of the coupling agent, and the signaling layer comprises an RFID-identifier.

2. The coating according to claim 1, wherein the first layer is a protective layer with a melting point over 170° C.

3. The coating according to claim 1, wherein the second layer further comprises a material selected from the group consisting of paper, cloth material, textile material, and their combinations.

4. The coating according to claim 1, wherein the second layer contains polyolefin and/or the coupling agent.

5. The coating according to claim 1, wherein the film of the first and/or third layer is a mono-layer film.

6. The coating according to claim 1, wherein the film of the first and/or third layer is a 2-layer film.

7. The coating according to claim 1, wherein the film of the first and/or third layer is a 3-layer film.

8. The coating according to claim 1, wherein the film of the first and/or third layer is a multi-layer film.

9. The coating according to claim 1, wherein the coupling agent is maleic anhydride polyolefin.

10. The coating according to claim 9, wherein maleic acid is converted to maleic anhydride during the film manufacturing so that maleic anhydride conversion is more than 86% and unconverted maleic acid conversion is less than 14%.

11. The coating according to claim 1, wherein the polyolefin of the first layer comprises polyethylene, polypropylene, metallocene produced polyethylene, or combinations thereof.

12. The coating according to claim 1, wherein the polyolefin of the third layer comprises polyethylene, polypropylene, metallocene produced polyethylene, or combinations thereof.

13. The coating according to claim 1, wherein the film is manufactured by co-extrusion, and the extrusion temperature is between 180-200° C. to activate the coupling agent during the film manufacturing.

14. A wood board, wherein it has been coated by the coating according to claim 1.

* * * * *

UNITED STATES PATENT AND TRADEMARK OFFICE
CERTIFICATE OF CORRECTION

PATENT NO. : 8,309,220 B2
APPLICATION NO. : 13/120487
DATED : November 13, 2012
INVENTOR(S) : Kiljunen et al.

It is certified that error appears in the above-identified patent and that said Letters Patent is hereby corrected as shown below:

Col. 8, line 59: "S-layer film" should read --3-layer film--

Col. 10, line 50: "6 month and month" should read --6 month and 12 month--

Signed and Sealed this
Fifth Day of March, 2013

Teresa Stanek Rea
*Acting Director of the United States Patent and Trademark Office*